United States Patent
Ender et al.

(10) Patent No.: US 6,478,290 B2
(45) Date of Patent: Nov. 12, 2002

(54) PACKING FOR MASS TRANSFER COLUMN

(75) Inventors: Christoph Ender, Wichita, KS (US); John Fredric Billingham, Getzville, NY (US); Michael James Lockett, Grand Island, NY (US); Neil Yeoman, Merrick, NY (US); Robert Kuratle, Winterthur (CH); Kirk A. Walztoni, Eagan, MN (US); Daniel L. Kallenberger, Wichita, KS (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/726,586

(22) Filed: Dec. 1, 2000

(65) Prior Publication Data

US 2001/0040303 A1 Nov. 15, 2001

Related U.S. Application Data

(60) Provisional application No. 60/169,855, filed on Dec. 9, 1999, now abandoned, provisional application No. 60/178,010, filed on Jan. 24, 2000, now abandoned, provisional application No. 60/178,042, filed on Jan. 24, 2000, now abandoned, and provisional application No. 60/170,380, filed on Dec. 13, 1999, now abandoned.

(51) Int. Cl.[7] .................................................. B01F 3/04
(52) U.S. Cl. ............................ 261/112.2; 261/DIG. 72
(58) Field of Search ........................ 261/112.2, DIG. 72

(56) References Cited

U.S. PATENT DOCUMENTS

| | | | | |
|---|---|---|---|---|
| 3,374,992 A | * | 3/1968 | Greer | 261/112.2 |
| 4,186,159 A | * | 1/1980 | Huber | 261/DIG. 72 |
| 4,296,050 A | | 10/1981 | Meier | 261/112 |
| 5,124,087 A | * | 6/1992 | Bradley et al. | 261/112.2 |
| 5,147,583 A | * | 9/1992 | Bugler, III et al. | 261/112.2 |
| 5,167,879 A | * | 12/1992 | Streng | 261/112.2 |
| 5,217,788 A | * | 6/1993 | Rye | 261/112.2 |
| 5,320,651 A | * | 6/1994 | Drummond | 261/112.2 |
| 5,413,872 A | * | 5/1995 | Faigle | 261/112.2 |
| 5,632,934 A | | 5/1997 | Billingham et al. | 261/112.2 |
| 5,921,109 A | | 7/1999 | Billingham et al. | 62/643 |
| 6,101,841 A | | 8/2000 | Billingham et al. | 62/643 |
| 6,206,349 B1 | * | 3/2001 | Parten | 261/DIG. 72 |
| 6,212,907 B1 | * | 4/2001 | Billingham et al. | 261/112.2 |

FOREIGN PATENT DOCUMENTS

| | | | | |
|---|---|---|---|---|
| EP | 858366 | | 7/2000 | |
| RU | 1183158 | * | 10/1985 | 261/112.2 |
| WO | WO 94/02794 | * | 2/1994 | 261/DIG. 72 |

* cited by examiner

Primary Examiner—C. Scott Bushey
(74) Attorney, Agent, or Firm—Stanley Ktorides

(57) ABSTRACT

A packing section includes a plurality of vertically oriented, diagonally cross-corrugated packing sheets defining a section height. The section height has a base region, a bulk region, and a top region. The base region has a first particular geometry different from the geometry of the bulk region. The top region has a second particular geometry different from the geometry of the bulk region, and different from the first particular geometry of the base region.

8 Claims, 4 Drawing Sheets

PACKING FOR MASS TRANSFER COLUMN

CROSS REFERENCE TO RELATED APPLICATIONS

This application claims the benefit of provisional applications Serial No. 60/169,855, filed Dec. 9, 1999; Serial No. 60/170,380, filed Dec. 13, 1999; Serial No. 60/178,010, filed Jan. 24, 2000; and Serial No. 60/178,042, filed Jan. 24, 2000, now abandoned.

TECHNICAL FIELD

This invention relates to structured packing for an exchange column, and, particularly, for a mass transfer column such as a cryogenic rectification column.

BACKGROUND OF THE INVENTION

Various types of exchange columns have been known in which a gas and a liquid come into contact with one another, generally in countercurrent flow. It is common to use packing elements formed of corrugated sheets or plates which contact one another and are disposed in parallel to the column axis to encourage contact between the liquid and gas. In such cases, the folds or corrugations of the plates are disposed at an angle to the column axis. Additionally, improvements have been made to structured packing to decrease the gas flow resistance in the lower region of a structured packing section, thus increasing the packing capacity. More specifically, the pressure drop associated with the gas or vapor entry into the structured packing section is made to be less than the pressure drop which would be experienced if the configuration of the structured packing in the lower region had the same configuration as in the upper portion of the structured packing section. Such improvements are described in U.S. Pat. No. 5,632,934. This patent contemplates a bulk region and a base region. The patent discloses the base region having various configurations to reduce the pressure drop therein.

A packing structure is needed which has further increased performance characteristics.

SUMMARY OF THE INVENTION

Accordingly, it is an object of the present invention to provide a packing section whose geometry can be varied in a base region, a top region, or both, to accomplish various performance requirements of a column.

A further object of the present invention is to provide a packing section wherein surface texturing is selectively used throughout the packing section to provide the desired performance of the column.

Accordingly, the present invention provides for a packing section, including a plurality of vertically oriented, diagonally-cross-corrugated packing sheets defining a section height. The section height has a base region, a bulk region, and a top region. The base region has a first particular geometry different from the geometry of the bulk region. The top region has a second particular geometry different from the geometry of the bulk region, and different from the first geometry of the base region.

The invention further includes a packing section having a plurality of vertically oriented, diagonally cross-corrugated packing sheets defining a section height. The section includes a base region, a bulk region, and a top region. The bulk region includes surface texturing. Further, at least a portion of at least one of the base region and the top region does not have surface texturing.

The invention further provides for a packing section having a plurality of vertically oriented, diagonally cross-corrugated packing sheets defining a section height. The section has a base region, a bulk region, and a top region. The bulk region includes generally horizontal fluting. Further, at least a portion of at least one of the base region and the top region includes generally vertical fluting.

Additional objects, advantages, and novel features of the invention will be set forth in part in the description which follows, and in part will become apparent to those skilled in the art upon examination of the following, or may be learned by practice of the invention.

BRIEF DESCRIPTION OF THE DRAWINGS

In the accompanying drawings, which form apart of this specification, and are to be read in conjunction therewith, and in which like reference numerals are used to indicate like parts in the various views.

DETAILED DESCRIPTION OF THE PREFERRED EMBODIMENTS

The present invention is directed to an improvement of U.S. Pat. No. 5,632,934, the disclosure of which is incorporated herein by reference. More specifically, U.S. Pat. No. 5,632,934 is directed to varying the configuration in the base region of a packing section, and discloses various different configurations in the base region to decrease the gas pressure drop in the base region. For instance, the patent discloses reducing gas resistance in the base region by having: (1)

staggered sheets in the base region, (2) flat portions in the base region, (3) reduced cross section corrugations in the base regions, (4) steeper corrugations in the base region, (5) orifices in the base region, (6) sawtooth configurations in the base region, and (7) louvers in the base region. The present invention improves the performance of this known packing, as will be more fully described below.

Figure 1:
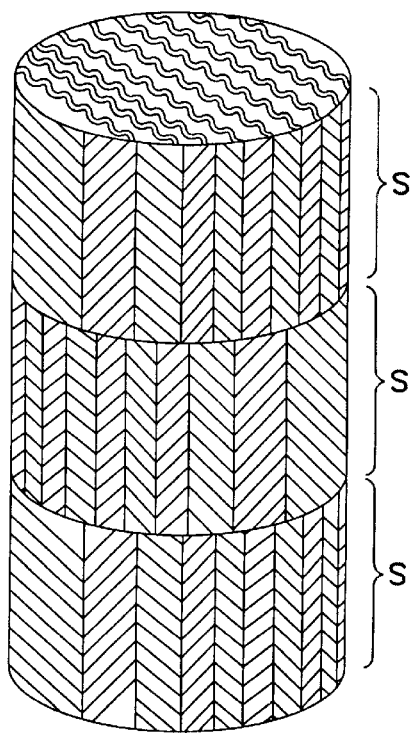
FIG. 1 is a top perspective view of various packing sections disposed one on top of one another as if positioned in a column.

With reference to FIG. 1, structured packing includes vertically oriented sheets with corrugations at an angle to the vertical axis of a column. Sheets, are arranged such that the corrugation direction of adjacent sheets is reversed to one another. The packing is installed in the column as layers or sections "S". Adjacent sections S are rotated around a vertical axis to enhance mixing, as is shown in FIG. 1.

Figure 2A:
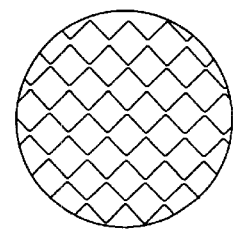
FIG. 2a is a top plan view of a single packing section.
Figure 2B:
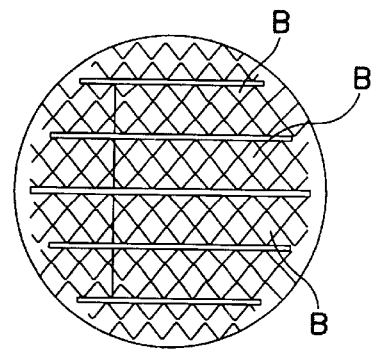
FIG. 2b is a top plan view of a cross section through a column showing various packing bricks making up a packing section layer.

In smaller columns, each layer may be comprised of a single section or brick of packing formed by affixing individual sheets together, as is shown in FIG. 2a. In larger columns, each packing section S may be made from several bricks "B" that fit together to fill a cross section of the containing vessel, as is shown in FIG. 2b. The complete packing column comprises multiple sections S of packing, the number of sections S being set by the height of packing required to perform the separation.

Figure 3:
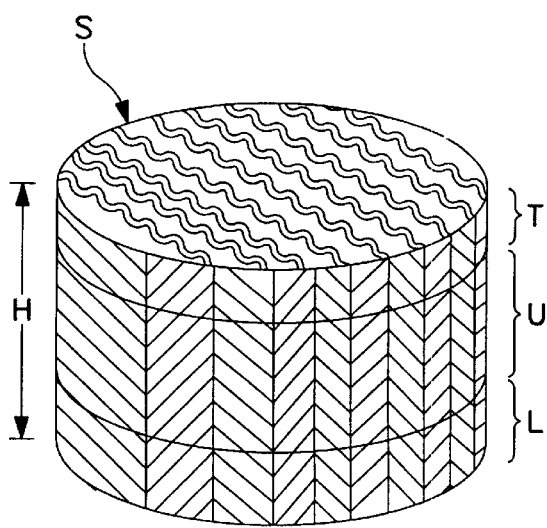
FIG. 3 is a top perspective view of a packing section.

With reference to FIG. 3, one packing section S is shown. Packing section S has a height "H", a top region "T", a bulk region "U" and a base region "L". Typically, the height of the base region L and the height of top region T each would be about 5% to 10% of the section height H, but, depending upon a number of considerations and particular performance characteristics of the column, could each be smaller or each be as large as one-third of the section height H. Region L and region T need not be the same height, and could significantly vary depending upon the desired performance characteristics of the column.

It has been found preferable to have the height of region L and region T be dependent upon the specific surface area of the packing. More specifically, the specific surface area of a packing is a function of the crimp size of the sheets. The smaller the crimp size, generally the larger the specific surface area. Specific surface area is usually defined as the surface area of the sheets in a packing section (in $m^2$) divided by the volume of the packing section (in $m^3$). It has been found that the larger the specific surface area for a given section height H, the smaller the height of regions L and T need to be. Table 1 below demonstrates this correlation for a section height H about 8 in. to 11 in.

Figure 4:
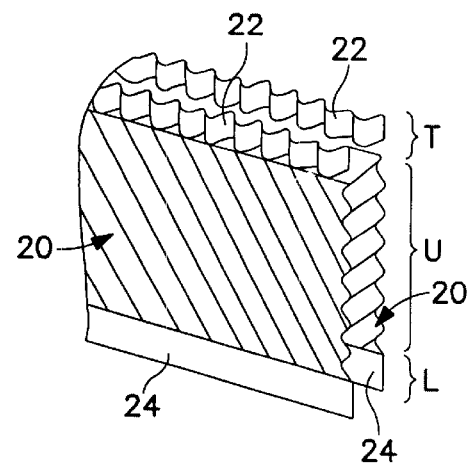
FIG. 4 is a top perspective view of two structured packing sheets embodying a first embodiment of the present invention.

With reference to FIG. 4, one embodiment of the present invention is shown. In this embodiment, two adjacent packing sheets 20 are shown. The bulk region U of the sheets 20 have angled corrugations, and adjacent sheets 20 extend in different directions. Top region T of each sheet 20 includes generally vertical corrugations 22. More specifically, these corrugations can be of the same height and cross section as the corrugations found in bulk region U; however, they are angled more vertically than the corrugations in bulk region U. The steeper corrugations 22 are shown in FIG. 4 as being vertical; however, they need not necessarily be vertical. They may have, instead, a closer to vertical angle than the corrugations found in bulk region U. Further, the transition from the corrugations in bulk region U to vertical corrugations 22 is shown as abrupt. A gradual transition is also contemplated. With still further reference to FIG. 4, sheets 20 are shown as having flat sections 24 in base region L. More specifically, there are generally no corrugations at all in base region L. The present invention of having different geometries in top region T and base region L allows further increased performance of a packing section. More specifically, the steeper corrugations in top region T allow easier transitioning of vapor into the above packing element, while flat section 24 in base region L helps decrease vapor pressure drop in base region L and in the transition region.

Figure 5:
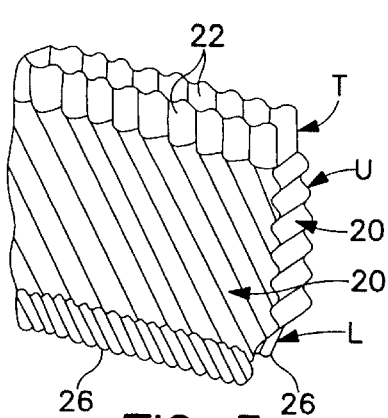
FIG. 5 is a view similar to FIG. 4, but showing a second embodiment of the present invention.

A further embodiment is shown in FIG. 5, wherein sheets 20 have the same vertical corrugations 22 in top region T; but, however, have reduced cross section corrugations 26 in base region L. More specifically, corrugations 26 are smaller in height than the corrugations found in bulk region U. Again, this difference in geometry recognizes the needs of the different regions of the packing section to accomplish transition and pressure reduction.

Although the above two embodiments are disclosed, as is apparent, it may be desirable to have other different geometries in the top region T and the lower region L. Such geometries can be as those disclosed in U.S. Pat. No. 5,632,934.

It is known to utilize surface texturing on packing sheets 20. The term "surface texturing", as used herein, is to be understood as denoting any roughening, slitting, stamping and/or impressing of the sheet surface. Examples of surface texturing include, but are not limited to, grooving ("fluting"), impression of a pattern, for example, a herringbone or waffle pattern, or small deformed slits. An example of "fluting" can be found in U.S. Pat. No. 4,296,050, the disclosure of which is incorporated herein by reference. This patent discloses fine fluting in the form of grooves. The fine fluting results in spreading of liquid over the sheet surfaces as a result of capillary action.

Figure 6:
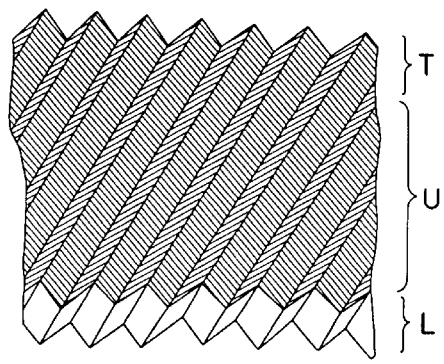
FIG. 6 is a top perspective view of a single packing sheet showing a third embodiment of the present invention.

With reference to FIG. 6, a further embodiment of the present invention is shown. More specifically, in this embodiment, a base region L of a sheet 20 is shown, wherein the base region L does not have the surface texturing shown in the bulk region U and the top region T. The embodiment shown in FIG. 6 discloses the surface texturing in region U and region T as the fine fluting of a packing sheet. The fine fluting extends generally horizontally and results in the spreading of liquid across the face of the sheet. Although the "surface texturing" shown is fine fluting, any other surface texturing could also be used. In the base region L, there may not be a need to have the liquid move across the packing, but instead to have the liquid move quickly off the packing sheet to the packing section below. Therefore, the absence of any surface texturing in base region L can accomplish this. Additionally, top region T can also be void of surface texturing to accomplish the desired performance characteristics of the column. Therefore, a sheet is contemplated where both top region T and base region L, or only base region L or only top region T is devoid of surface texturing.

Figure 7:
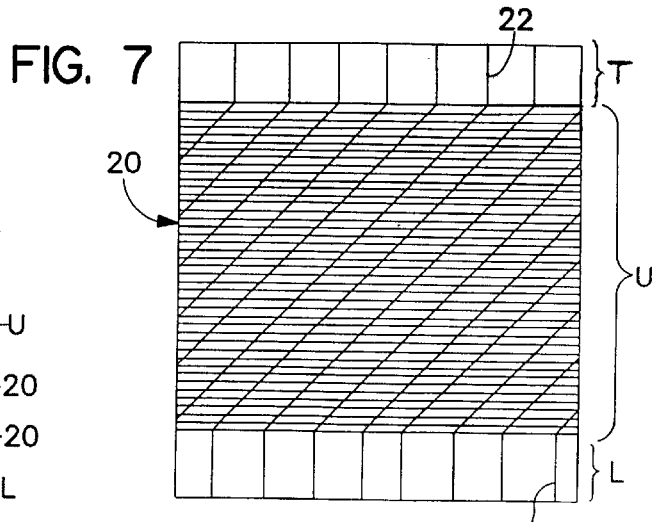
FIG. 7 is a front elevational view of a single packing sheet showing a fourth embodiment of the present invention.

With reference to FIG. 7, a further embodiment of the present invention is shown. More specifically, a sheet 20 is shown having a bulk region U with fine flutings extending generally horizontal to the axis of vertical corrugations 22. However, top region T and base region L do not have any surface texturing.

Figure 8:
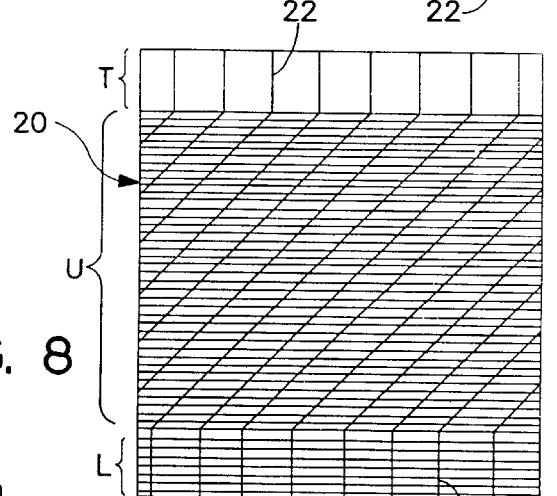
FIG. 8 is a front elevational view of a single packing sheet showing a fifth embodiment of the present invention.

With reference to FIG. 8, a further embodiment is shown which is similar to FIG. 7; however, top region T, while having vertical corrugations 22, does not have fine fluting. However, base region L does have fine fluting in addition to vertical corrugations 22.

Figure 9:
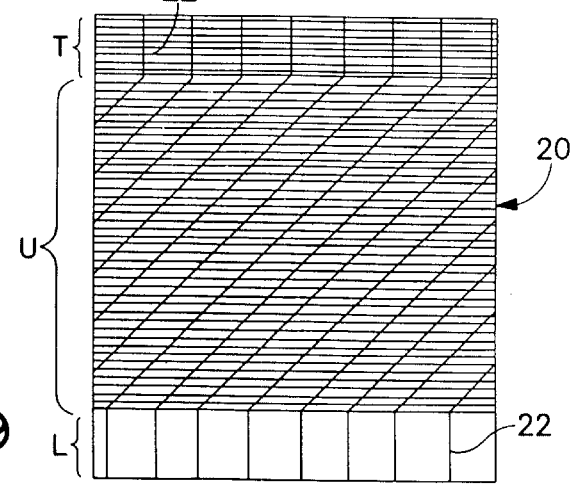
FIG. 9 is a front elevational view of a single packing sheet showing a sixth embodiment of the present invention.

FIG. 9 is a further variation of FIGS. 7 and 8, wherein top region T has fine fluting and vertical corrugations 22 while bottom region L does not have fine fluting, but does have vertical corrugations 22.

As discussed above, fine fluting has been shown extending generally horizontal to the axis of the column. As is apparent, any other surface texturing could be used.

Figure 10:
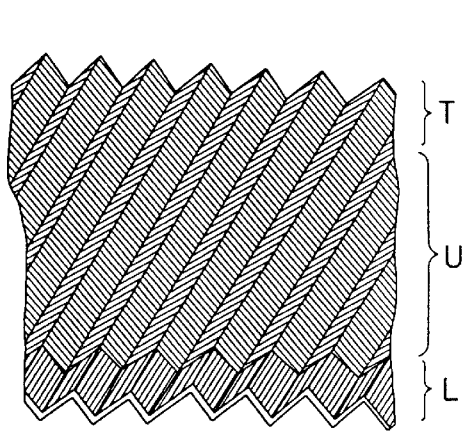
FIG. 10 is a top perspective view of a single packing sheet showing a seventh embodiment of the present invention.

It has been found that it may be desirable to enhance the removal of liquid from a section or a sheet to have generally vertical fine fluting in at least a portion of base region L or top region T. With reference to FIG. 10, a sheet 20 is shown, wherein there are generally horizontal fine flutings in the bulk region U and top region T; however, there is vertical fine fluting in base region L. As is apparent, there could be other variations wherein the generally vertical fine fluting is utilized in both top region T and bottom region L, or just in the top region T and not in the base region L.

Figure 11:
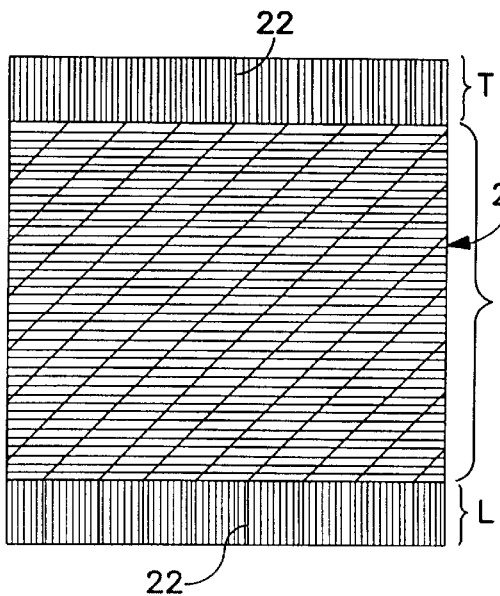
FIG. 11 is a front elevational view of a single packing sheet showing an eighth embodiment of the present invention.

With reference to FIG. 11, a still further embodiment is shown wherein top region T and base region L of a sheet 20 each have vertical corrugations 22. Additionally, each of top region T and base region L have generally vertical fine fluting, as opposed to the generally horizontal fine fluting found in base region U.

Figure 12:
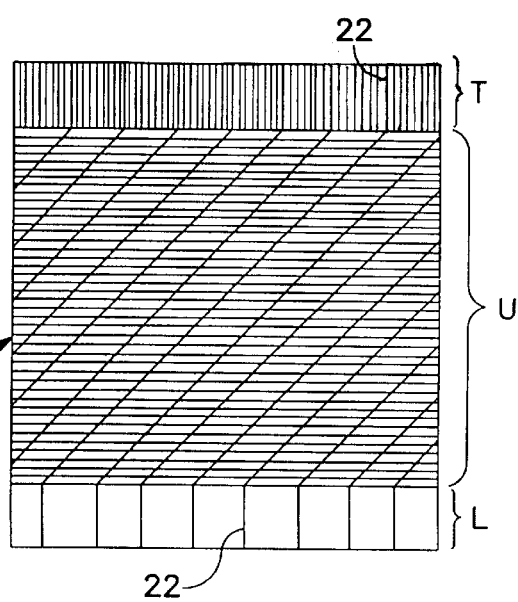
FIG. 12 is a front elevational view of a single packing sheet showing a ninth embodiment of the present invention.

With reference to FIG. 12, another embodiment is shown wherein a sheet 20 includes top region T and base region L with vertical corrugations 22. Additionally, top region T has generally vertical fine fluting, bulk region U has generally horizontal fine fluting, and base region L has no fine fluting at all.

Figure 13:
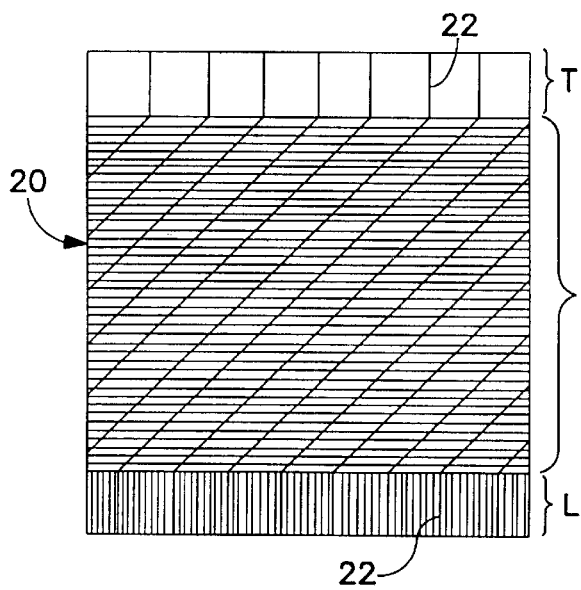
FIG. 13 is a front elevational view of a single packing sheet showing a tenth embodiment of the present invention.

A still further embodiment is shown in FIG. 13, again wherein both top region T and base region L have vertical corrugations 22 but wherein top region T has no fine fluting, bulk region U has generally horizontal fine fluting, and bottom region L has generally vertical fine fluting.

Although the vertical fluting in the drawings are shown as vertical, any fluting that extends at a steeper angle than the generally horizontal fluting could be used to possibly enhance the performance characteristics of the column. Additionally, the generally horizontal fine fluting in bulk region U could be any other suitable surface texturing.

As is apparent, various surface texturing combinations can be utilized in top region T and bottom region L, with the different geometries disclosed in U.S. Pat. No. 5,632,934. For instance, any of the generally horizontal fine fluting and vertical fluting combinations disclosed above could be utilized in conjunction with the flat sheet 24 geometries, or reduced corrugation height geometry 26 discussed above.

Further, with respect to all the above embodiments, in addition to surface texturing, a sheet 20 could have a plurality of discrete apertures disposed throughout. Such apertures could be as disclosed in U.S. Pat. No. 4,296,050. If such apertures are disposed in a sheet 20, it may be desirable to have top region T or bottom region L, or both, be devoid of such apertures in addition to being devoid of surface texturing.

The present invention may be used in any distillation, absorption, or stripping process, which may employ structured packing. Examples, but not limitations of the structured packing include, oil fractionations, hydrocarbon separations, alcohol distillations, and cryogenic rectification such as cryogenic air separation systems.

From the foregoing, it will be seen that this invention is one well-adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

Figure 14:
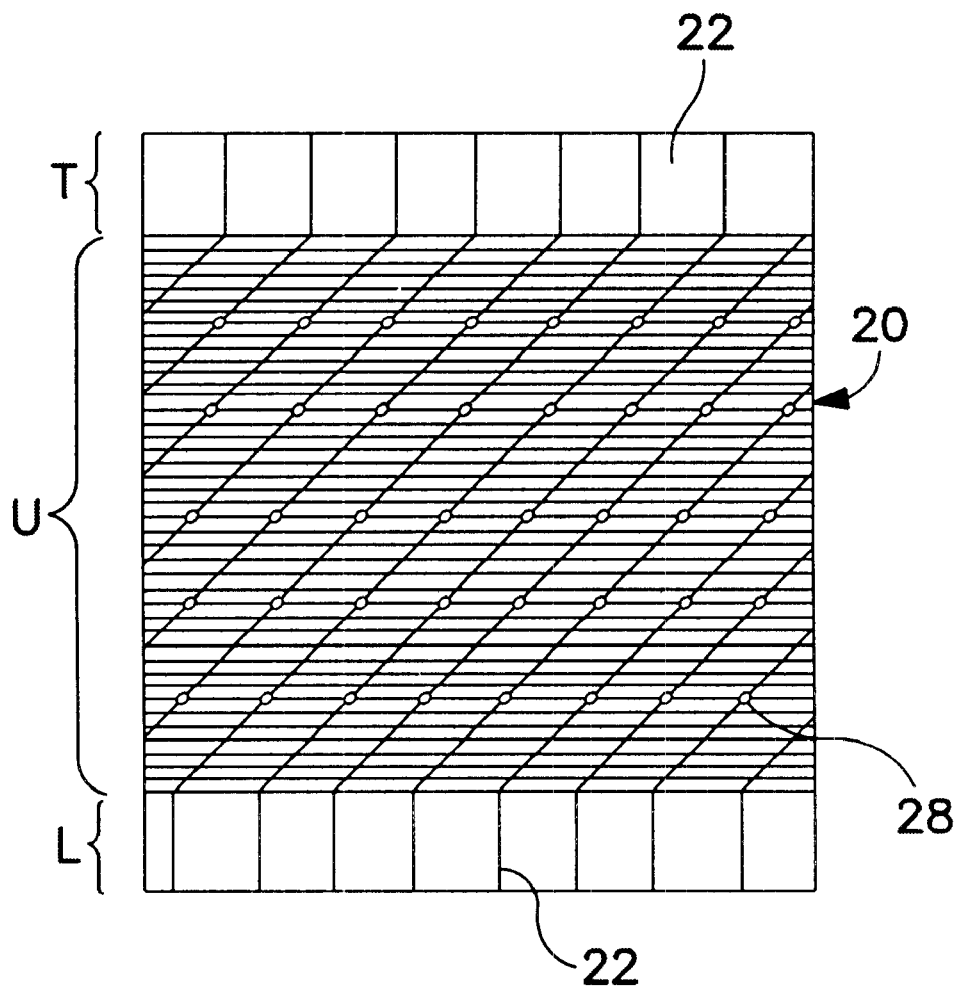
FIG. 14 is a front elevational view of a single packing sheet showing an eleventh embodiment of the present invention.

For example, as shown in FIG. 14, sheet 20 is shown as having a bulk region U with fine fluting extending generally horizontal to the axis of the column. Bulk region U also has apertures 28 disposed throughout. Top region T and bottom region L each have vertical corrugations 22. However, top region T and base region L do not have any surface texturing, nor do they have any apertures 28. Thus, the surfaces of top region T and base region L are smooth.

What is claimed is:

1. A packing section comprising:

a plurality of vertically oriented diagonally cross-corrugated packing sheets defining a section height, said section having a base region, a bulk region and a top region;

wherein said base region has a first particular geometry different from a geometry of said bulk region; and wherein said top region has a second particular geometry different from the geometry of said bulk region and different from the first particular geometry of said base region; and wherein the top region includes a surface texturing and the base region is void of surface texturing.

2. The packing section of claim 1 wherein the surface texturing comprises fine fluting.

3. A packing section comprising:

a plurality of vertically oriented, diagonally cross-corrugated packing sheets defining a section height, said section having a base region, a bulk region, and a top region;

wherein said bulk region includes a surface texturing; and wherein the top region includes a surface texturing and the base region is void of surface texturing.

4. The packing section of claim 3 wherein corrugations in said base region are steeper than corrugations in said bulk region.

5. The packing section of claim 4 wherein said corrugations in said base region are vertical.

6. The packing section of claim 3 wherein corrugations in the top region are steeper than corrugations in said bulk region.

7. The packing section of claim 6 wherein said corrugations in said top region are vertical.

8. The packing section of claim 3 wherein the surface texturing comprises fine fluting.

* * * * *